United States Patent
Whang

[11] Patent Number: 6,009,809
[45] Date of Patent: Jan. 4, 2000

[54] BRIDGEWIRE INITIATOR

[75] Inventor: David S. Whang, Bloomfield, Hills, Mich.

[73] Assignee: Automotive Systems Laboratory, Inc., Farmington Hills, Mich.

[21] Appl. No.: 08/989,539

[22] Filed: Dec. 12, 1997

[51] Int. Cl.[7] .................................................. F42B 3/10
[52] U.S. Cl. .................................. 102/202.7; 102/202.9; 102/202.14
[58] Field of Search .............................. 102/202.5, 202.6, 102/202.7, 202.8, 202.9, 202.1, 202.12, 202.14, 530; 280/741

[56]  References Cited

U.S. PATENT DOCUMENTS

| | | | |
|---|---|---|---|
| 3,082,691 | 3/1963 | Evans et al. | 102/202.14 |
| 3,135,200 | 6/1964 | Jackson | 102/202.9 |
| 4,329,924 | 5/1982 | Lagofun | 102/202.8 |
| 4,335,653 | 6/1982 | Bratt et al. | 102/202.5 |
| 4,402,269 | 9/1983 | Smith | 102/202.13 |
| 4,734,265 | 3/1988 | Nilsson et al. | 422/165 |
| 5,241,910 | 9/1993 | Cunningham et al. | 102/530 |
| 5,403,036 | 4/1995 | Zakula et al. | 280/741 |
| 5,454,320 | 10/1995 | Hilden et al. | 102/202.7 |
| 5,556,132 | 9/1996 | Sampson | 280/741 |
| 5,558,366 | 9/1996 | Fogle, Jr. et al. | 280/736 |
| 5,576,509 | 11/1996 | Refouvelet et al. | 102/202.7 |
| 5,602,359 | 2/1997 | Hambro et al. | 102/202.5 |
| 5,713,597 | 2/1998 | Bailey | 280/741 |
| 5,732,634 | 3/1998 | Flickinger et al. | 102/202.5 |

OTHER PUBLICATIONS

Definition for "concave"; Random House College Dictionary, 1980.

*Primary Examiner*—Harold J. Tudor
*Attorney, Agent, or Firm*—Lyon, P.C.

[57]  ABSTRACT

The disclosure relates to a bridgewire initiator used to ignite a booster charge in an airbag inflator. A pair of connectors are electrically connected to a bridgewire disposed within a charge holder containing an ignition composition. The ignition composition is biased against the bridgewire by an output cup having a concave end telescoped over the charge holder. When firing current is applied to the connectors the bridgewire is electrically heated thereby igniting the booster charge.

2 Claims, 1 Drawing Sheet

U.S. Patent
Jan. 4, 2000
6,009,809
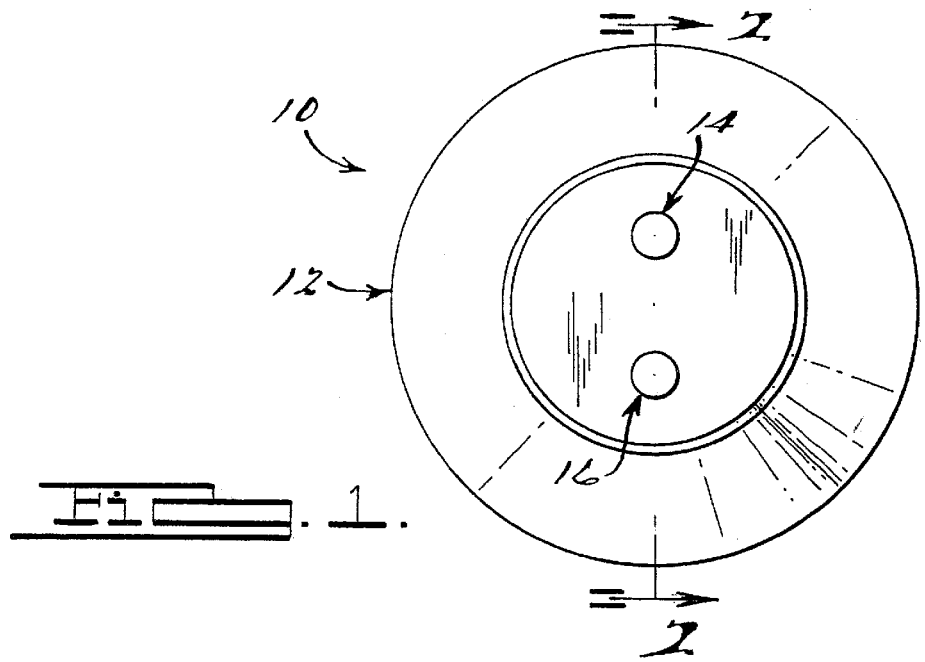
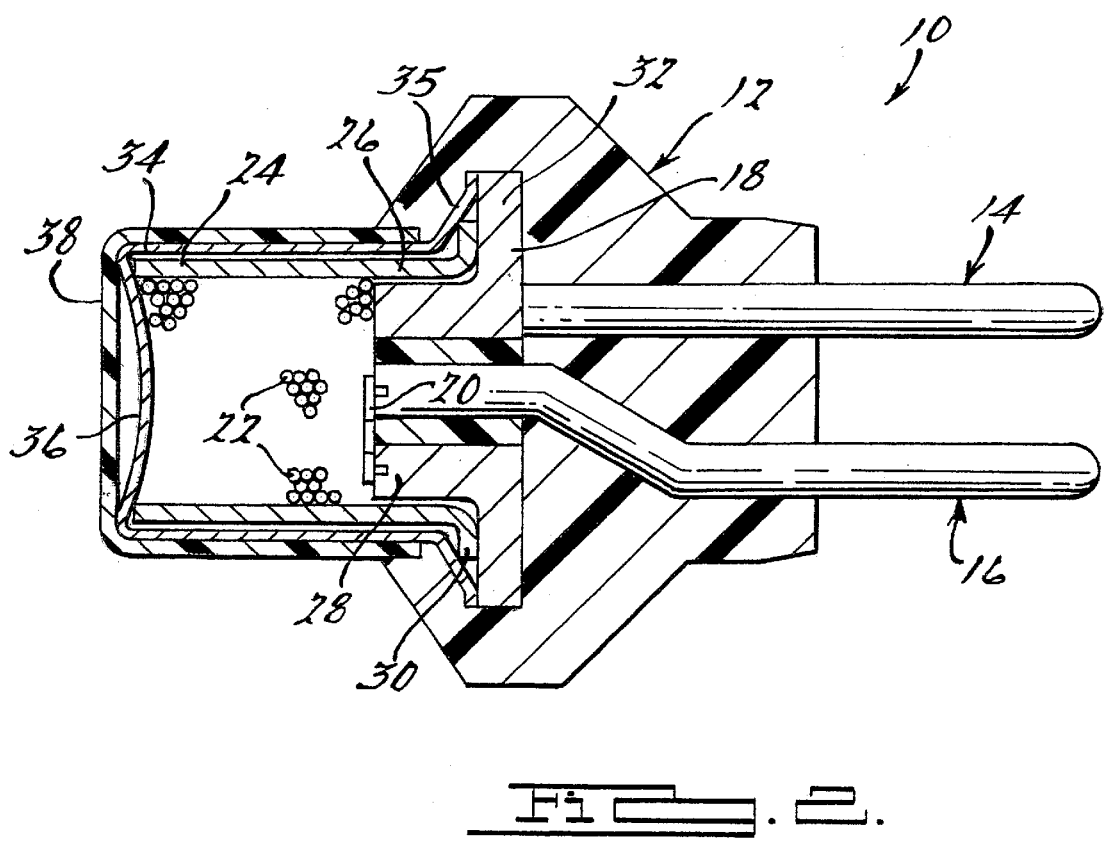

BRIDGEWIRE INITIATOR

This invention relates to an initiator for automotive passenger restraint air bag inflators and seatbelt pretensioners, and more specifically, to an improved bridgewire initiator that offers high reliability at low cost, small size, and improved high volume manufacturability when compared to currently available initiators.

BACKGROUND OF THE INVENTION

Typically, initiators used to initiate ignition of the propellant that inflates an air bag or actuates a seatbelt pretensioner of an automotive passenger restraint system comprise an electroexplosive. Such initiators generally consist of a bridgewire such as nichrome or evanhom wire that is in direct contact with an ignition composition. Ignition compositions suitable for use as initiating charges include boron-potassium nitrate and smokeless powder as taught in U.S. Pat. No. 3,715,131. The bridgewire is connected between two electrical contacts which are connected to a firing circuit. When firing current is applied to the firing circuit, the bridgewire is electrically heated, and the ignition composition is ignited. The combustion of the initiator ignites a booster charge that effects ignition of the propellant.

However, known initiators exhibit a problem in that intimate contact between the bridgewire and the ignition composition is not always assured. In addition, the hermetic seal used to protect the ignition composition often deteriorates over the lifespan of the initiator in the field. Furthermore, fabrication of known initiators is complex and costly.

SUMMARY OF THE INVENTION

The aforesaid problems are solved by the initiator of the present invention wherein the ignition composition is superimposed directly over the bridgewire. The length to diameter ratio of the ignition composition is approximately 1. The initiator output cup is provided with multiple mechanisms to maintain a bias on the ignition composition, thence on the bridgewire, regardless of the tolerance stack-up of the individual components. Stress on the weld joint between the cup and the header is also reduced.

BRIEF DESCRIPTION OF THE DRAWINGS

FIG. 1 is an end view of a bridgewire initiator in accordance with the present invention.

FIG. 2 is a cross sectional view taken along the line 2—2 of FIG. 1.

DETAILED DESCRIPTION OF THE PREFERRED EMBODIMENT(S)

A bridgewire initiator 10 in accordance with a preferred constructed embodiment of the present invention comprises an insulating housing 12 that encapsulates a pair of electrical connectors 14 and 16. Connector 14 is electrically connected to a conductive header 18. Connector 16 is electrically connected to one end of a bridgewire 20, the other end of which is connected to the header 18.

A conventional ignition composition 22 is enclosed by a cylindrical charge holder 24, one end 26 of which is telescoped over a cylindrical portion 28 of the header 18. The cylindrical charge holder 24 has a radial flange 30 that abuts a radial flange 32 on the header 18 for positioning purposes.

An output cup 34 closes the cylindrical charge holder 24, a concave end portion 36 thereof maintaining a bias on the ignition charge 22. The output cup 34 also has a truncated conical radial flange 35 that abuts header radial flange 32 for positioning purposes. The periphery of the open end of an insulating cup 38 is telescoped over the output cup 34 to provide for electrical insulation of the assembly. It is to be noted that the housing 12 is molded about the aforesaid components to facilitate sealing of the assembly.

From the foregoing description it should be apparent that reliability of the initiator 10 is maximized by consolidation of the ignition composition under pressure in direct contact with the bridgewire over the lifespan of the initiator without potential deterioration of the hermetic seal. Moreover, the invention uses components that are inexpensive, and producible in high volume by primary automated manufacturing techniques. Further, the invention optimizes utilization of the internal cavity of the initiator 10 particularly in the axial direction thereof. As a result, the invention offers a low profile (shorter) initiator 10 without compromise of the output thereof as compared to currently available initiators. The low profile initiator 10 will be beneficial in reducing the overall size of automotive passenger restraint inflators.

I claim:

1. A bridgewire initiator comprising;

an electrically conductive cylindrical header having a radial flange at one end thereof;

a first connector electrically connected to said header;

a second connector;

a bridgewire having one end electrically connected to said header and an opposite end electrically connected to said second connector;

a cylindrical charge holder telescoped over said header and having a radial flange abutting the radial flange of said header;

an ignition composition disposed internally of said cylindrical charge holder and juxtaposed against said bridgewire, wherein said ignition composition disposed within said cylindrical charge holder has a length to diameter ratio of approximately one; and a cylindrical output cup having an open end and a concave end, the open end of said output cup being telescoped over said cylindrical charge holder, and having a truncated conical radial flange abutting the radial flange of said header, the concave end of said output cup closing said charge holder and maintaining a bias on said ignition composition.

2. The initiator of claim 1 further comprising;

a cylindrical insulating cup having an open end telescoped over said output cup; and an insulating housing encapsulating said electrical connectors, the radial flange of said header, the radial flange of said charge holder, the radial flange of said output cup, and the periphery of the open end of said insulating cup.

* * * * *